US006745292B1

United States Patent
Stevens

(10) Patent No.: US 6,745,292 B1
(45) Date of Patent: Jun. 1, 2004

(54) APPARATUS AND METHOD FOR SELECTIVELY ALLOCATING CACHE LINES IN A PARTITIONED CACHE SHARED BY MULTIPROCESSORS

(75) Inventor: Roy M. Stevens, Lexington, SC (US)

(73) Assignee: NCR Corporation, Dayton, OH (US)

( * ) Notice: Subject to any disclaimer, the term of this patent is extended or adjusted under 35 U.S.C. 154(b) by 880 days.

(21) Appl. No.: 08/869,878

(22) Filed: Jun. 5, 1997

Related U.S. Application Data

(63) Continuation of application No. 08/569,335, filed on Dec. 8, 1995, now abandoned.

(51) Int. Cl.[7] .............................................. G06F 12/00
(52) U.S. Cl. ...................... 711/129; 711/118; 711/128; 711/154
(58) Field of Search ................................. 711/118, 128, 711/129, 130, 3, 154

(56) References Cited

U.S. PATENT DOCUMENTS

| | | | | |
|---|---|---|---|---|
| 3,947,823 A | | 3/1976 | Padegs et al. ............ | 340/172.5 |
| 4,264,953 A | | 4/1981 | Douglas et al. ............. | 364/200 |
| 4,371,929 A | * | 2/1983 | Brann et al. ................ | 395/865 |
| 4,380,797 A | | 4/1983 | Desyllas et al. ............ | 364/200 |
| 4,422,145 A | | 12/1983 | Sacco et al. ................ | 364/300 |
| 4,445,174 A | * | 4/1984 | Fletcher ...................... | 711/141 |
| 4,905,141 A | * | 2/1990 | Brenza ....................... | 395/456 |
| 4,980,822 A | | 12/1990 | Brantley, Jr. et al. ....... | 364/200 |
| 5,010,475 A | | 4/1991 | Hazawa ...................... | 364/200 |
| 5,157,774 A | | 10/1992 | Culley ........................ | 395/425 |
| 5,291,442 A | | 3/1994 | Emma et al. ................ | 395/425 |
| 5,295,246 A | | 3/1994 | Bischoff et al. ............. | 395/250 |
| 5,357,623 A | * | 10/1994 | Megory-Cohen ........... | 711/141 |
| 5,434,992 A | * | 7/1995 | Mattson ...................... | 711/118 |
| 5,490,261 A | * | 2/1996 | Bean et al. .................. | 395/448 |
| 5,579,508 A | * | 11/1996 | Yoshizawa et al. ......... | 711/172 |
| 5,581,724 A | * | 12/1996 | Belsan et al. ............... | 711/114 |
| 5,584,015 A | * | 12/1996 | Villette et al. | |
| 5,584,017 A | * | 12/1996 | Pierce et al. ................ | 711/146 |
| 5,689,680 A | * | 11/1997 | Whitaker et al. ........... | 711/127 |
| 5,737,749 A | * | 4/1998 | Patel et al. .................. | 711/129 |
| 5,737,750 A | * | 4/1998 | Kumar et al. ............... | 711/129 |
| 5,748,879 A | * | 5/1998 | Kobayashi ............. | 395/183.18 |
| 5,761,710 A | * | 6/1998 | Igami et al. ................. | 711/129 |
| 6,047,356 A | * | 4/2000 | Anderson et al. ........... | 711/129 |
| 6,049,850 A | * | 4/2000 | Vishlitzky et al. .......... | 711/136 |

* cited by examiner

*Primary Examiner*—Tuan V. Thai
(74) *Attorney, Agent, or Firm*—Ying Tuo; James M. Stover

(57) ABSTRACT

A computer system includes a cache memory which is shared by multiple processors. The cache memory is divided into a plurality of regions. Each of the processor is exclusively associated with one or more of the regions. All the processors have access to all regions on hits. However, on misses, a processor can cause memory allocation only within its associated region or regions. This means that a processor can cause memory allocation only over data it had fetched. By such arrangement, the "cross-thrash" problem is avoided.

10 Claims, 6 Drawing Sheets

FIG. 2
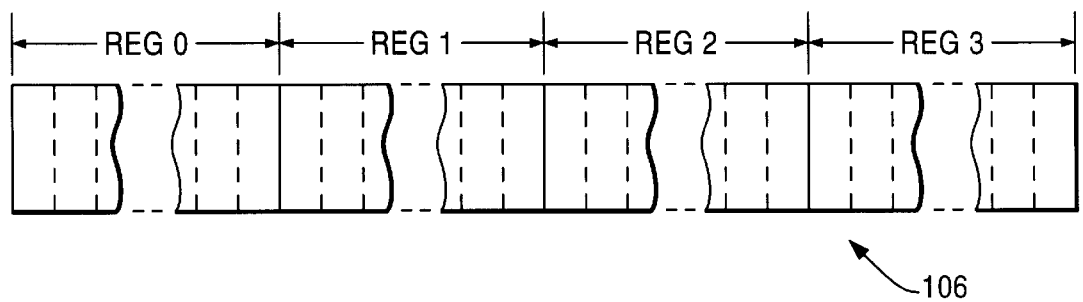
FIG. 3A
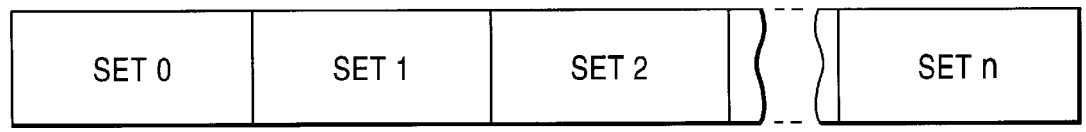
FIG. 3B
|  | REG 0 | REG 1 | REG 2 | REG 3 |
|---|---|---|---|---|
| SET 0 | | | | |
| SET 1 | | | | |
| SET 2 | | | | |
| ⋮ | | | | |
| SET n | | | | |

APPARATUS AND METHOD FOR SELECTIVELY ALLOCATING CACHE LINES IN A PARTITIONED CACHE SHARED BY MULTIPROCESSORS

This is a continuation of application Ser. No. 08/569,335, filed on Dec. 8, 1995 now abandoned.

BACKGROUND OF THE INVENTION

The present invention relates to computer systems, and more specifically to a computer system where multiple processors share a cache memory.

A typical computer system includes at least a processor and a main memory. In performing an instruction, the processor needs to get access to the main memory, to read a word or several words from, or possibly to write a word or several words to, the main memory. A word can be the instruction itself, an operand or a piece of data.

To obtain the fastest memory speed available and at the same time have a large memory size without imposing undue cost, a cache memory is provided between the processor and the main memory. Usually, the cache memory is faster in speed and smaller in size than the main memory.

Because the cache memory has a smaller size than that of the main memory, it contains only a copy of portions of the main memory. When the processor attempts to get access to an address in the main memory, a check is made to determine whether the main memory address has been allocated in the cache memory. If so, a desired operation (read or write operation) will be performed on the allocated address in the cache memory.

If the main memory address has not been allocated in the cache memory, a procedure will be invoked to allocate a space of the cache memory for the main memory address.

In getting access to an main memory address, if the main memory address has been allocated in the cache memory, it is a hit; if the main memory address has not been allocated in the cache memory, it is a miss. The performance of a cache memory can be measured by hit ratio.

When multiple processors share a single large cache memory, they can all take advantage of the large cache size to increase hit ratio and may effectively share programs and data already fetched by any one of the processors.

One problem to this scheme is that the access to the single large cache by the multiple processors may "cross-thrash," that is, an allocation in the cache memory may replace an entry that had been fetched (may be recently fetched) by some other processors.

Thus, there has been a need to provide an improved cache memory management, and a need to overcome the "cross-thrash" problem, in an environment where multiple processors share a single cache. The present invention provides the method and apparatus meeting these two needs.

SUMMARY OF THE INVENTION

In principle, the present invention divides a cache memory, which is shared by multiple processors, into a plurality of regions. Each of the processor is exclusively associated with one or more of the regions. All the processors have access to all regions on hits. However, on misses, a processor can cause memory allocation only within its associated region or regions. This means that a processor can cause memory allocation only over data it had fetched. By such arrangement, the "cross-thrash" problem is eliminated.

In one aspect, the present invention provides a novel method in use with a computer system including a plurality of processors, a main memory and a cache memory. The method comprises the steps of:

(a) dividing said cache memory into a plurality of regions;

(b) associating each of said processors with a respective one of said regions;

(c) generating an access address that contains content desired by one of said processors; and (d) if said access address has not been allocated in said cache memory, causing an allocation within a respective region associated with said one of said processors.

In another aspect, the present invention provides a novel apparatus for accelerating the access speed of a main memory. The apparatus comprises:

(a) a cache memory including a plurality of regions, said cache memory is shared by a plurality of processors, each of said processors is associated with a respective one of said regions;

(b) means for generating an access address that contains content desired by one of said processors; and (c) means, if said access address has not been allocated in said cache memory, for causing an allocation within a respective region associated with said one of said processors.

Accordingly, it is an objective of the present invention to provide an improved cache memory management in an environment where multiple processors share a single cache.

It is another objective of the present invention to overcome the "cross-thrash" problem in an environment where multiple processors share a single cache.

BRIEF DESCRIPTION OF THE DRAWINGS

The present invention will be readily understood to those skilled in the art from the following preferred embodiments and the appended claims, in conjunction with the accompanying drawing, in which:

FIG. 2 depicts one structural scheme of the cache memory shown in FIG. 1;

FIG. 3A depicts another structural scheme of the cache memory shown in FIG. 1;

FIG. 3B depicts a specific structural scheme of the cache memory sets shown in FIG. 3A;

DETAILED DESCRIPTION OF THE PREFERRED EMBODIMENTS

Figure 1:
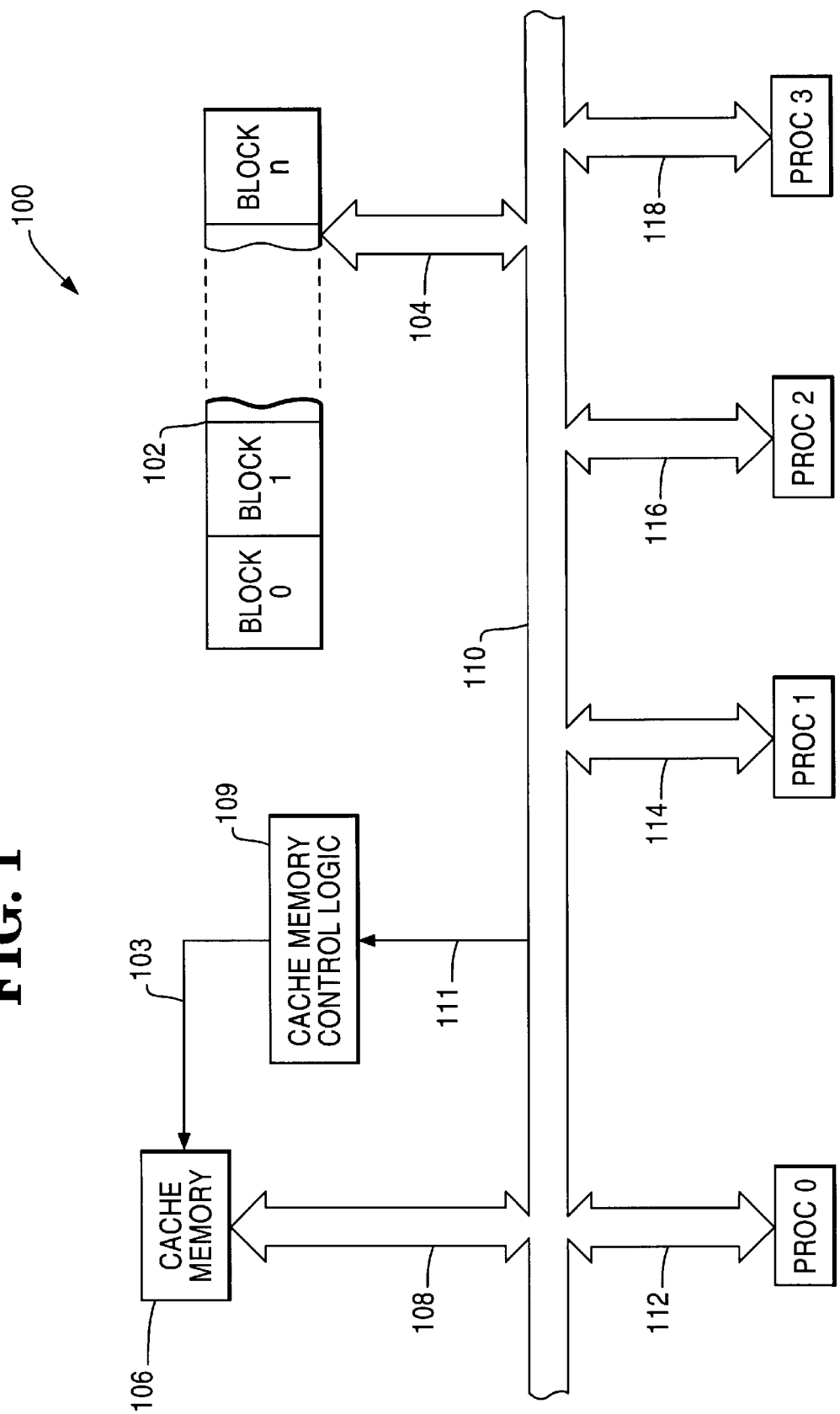
FIG. 1 is a block diagram of a computer system in which multiple processors share a cache memory, in accordance with the present invention.

Referring now to FIG. 1, there is shown computer system 100 in accordance with the present invention. Computer system 100 includes four processors (PROC 0, PROC 1, PROC 2 and PROC 3), main memory 102, main memory bus 104, cache memory 106, cache memory bus 108, cache memory control logic 109, main bus 110, and CPU buses 112, 114, 116, and 118.

Cache memory 106 is divided into a plurality of regions. Each of the four processors is exclusively associated with one or more regions. The structure of the cache memory will be shown in FIG. 2, and FIGS. 3A–3B in greater detail.

Main memory 102 has a plurality of blocks (BLOCK 0, BLOCK 1, . . . , and BLOCK n). Each of the blocks has a plurality of memory units and is associated with a block tag field.

Main memory bus 104 is connected between main memory 102 and main bus 110. Cache memory bus 108 is connected between cache memory 106 and main bus 110. PROC 0, PROC 1, PROC 2 and PROC 3 are connected to main bus 110 via CPU buses 112, 114, 116 and 118, respectively.

Through the interconnections of main memory bus 104, cache memory bus 108, main bus 110, and CPU buses 112, 114, 116, and 118, each of the four processors is connected to both main memory 102 and cache memory 106.

Cache memory control logic 109 is connected between cache memory 106 and main bus 110, via connection bus 103 and control line 111 respectively.

When PROC i (i=0, 1, 2, 3) attempts to get access to an address in main memory 102, if it is a hit, the processor performs a desired operation on the allocated address in cache memory 106. If it is a miss, a procedure is invoked to carry out the steps as to be shown in FIGS. 4 and 6A–6B. The procedure invoked can be stored either in main memory 102 or in an internal memory of PROC i.

When it is a hit, PROC i can perform an operation on an allocated address in cache memory 106 via main bus 110 and cache memory bus 108.

When it is a miss, PROC i can perform an operation on an access address in main memory 102 via main bus 110 and main memory bus 104. The contents in the block of main memory 102 containing the access address can also be moved into allocated slot in cache memory 106 via main memory bus 104, main bus 110 and cache memory bus 108.

FIG. 2 depicts one structural scheme of cache memory 106 of FIG. 1, which is divided into four regions (REG 0, REG 1, REG 2 and REG 3). PROC 0, PROC 1, PROC 2, and PROC 3 are associated with REG 0, REG 1, REG 2 and REG 3 respectively. Each of the four regions has a plurality of memory slots. The four processors have access to the four regions of cache memory 106 on hits. However on misses, a specific processor PROC i (i=0, 1, 2, and 3) can only cause allocation to REG i (i=0, 1, 2, and 3).

FIG. 3A depicts another structural scheme of cache memory 106 of FIG. 1, which has n sets shown as SET 0, SET 1, . . . , SET m. Each of the sets has a plurality of memory slots.

FIG. 3B depicts a specific structural scheme for SET j (j=0, 1, . . . , n) of FIG. 3A, with each SET j having 16 memory slots. In the embodiment shown in FIG. 3B, SET j is used as a 16-way set and divided into four regions (REG 0, REG 1, REG 2 and REG 3). For a SET j (j=0, 1, . . . , n), PROC 0 PROC 1, PROC 2 and PROC 3 are associated with the four regions (REG 0, REG 1, REG 2, and REG 3) respectively. The four processors have access to the four regions of SET j (j=0, 1, . . . , n) on hits. However on misses, a PROC i (i=0, 1, 2, 3) can only cause allocation to REG i in SET j (j=0, 1, . . . , n).

In FIGS. 2, 3A and 3B, each of the memory slots has a plurality of memory units and is associated with a slot tag field for storing the information to indicate corresponding memory block in main memory 102 shown in FIG. 1.

Figure 4:
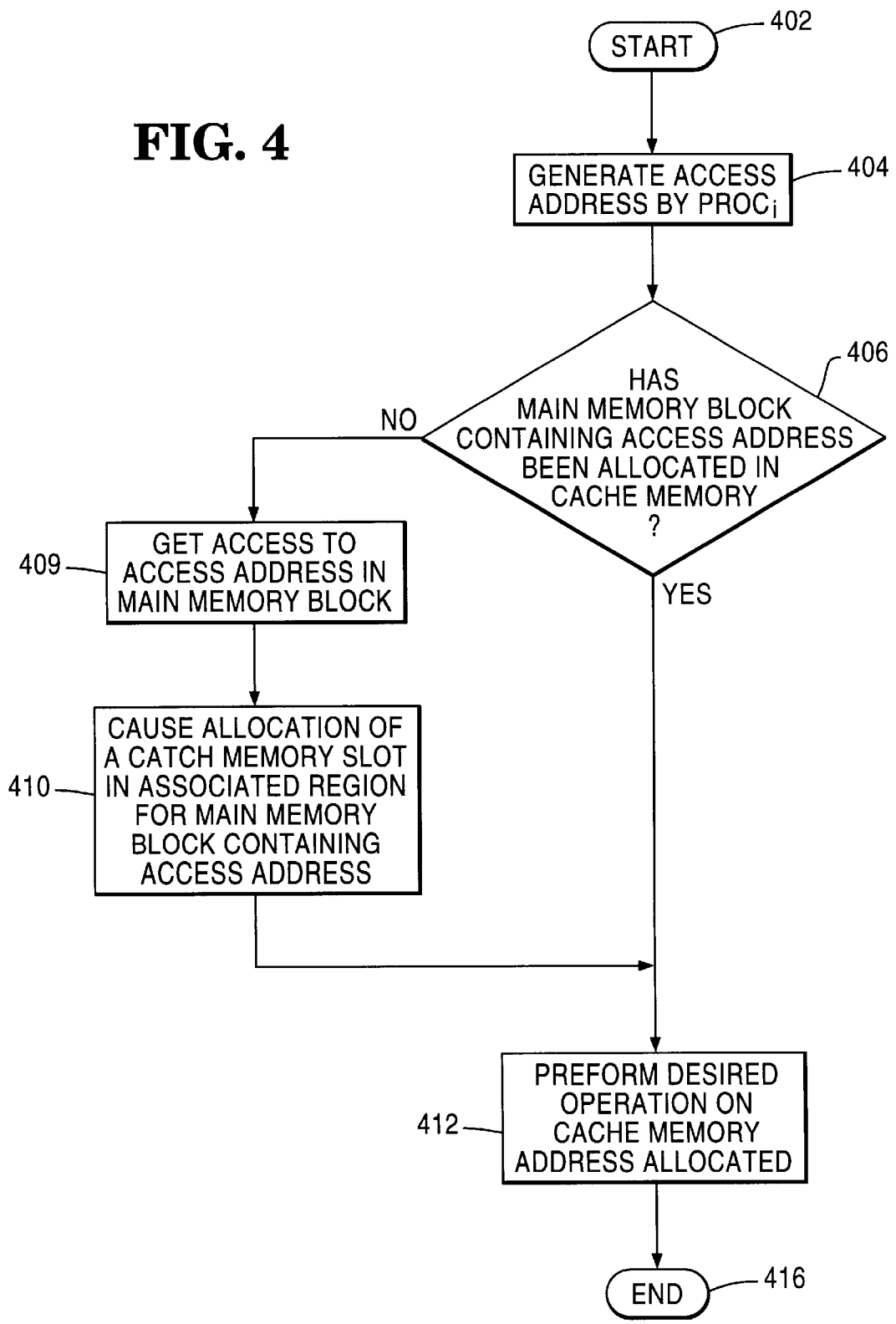
FIG. 4 depicts a flow chart showing cache memory operation by a processor, in accordance with the present invention.

FIG. 4 depicts a flow chart showing cache memory operation initiated by PROC i, in accordance with the present invention.

In step 404, PROC i generates an access address to main memory 102 shown in FIG. 1 and sends the access address to cache memory control logic 109. The access address should comply with the format shown in FIG. 5A or 5B.

In step 406, detection is made to detect whether the main memory block containing the access address has been allocated in cache memory 106 shown in FIG. 1.

If the main memory block has been allocated in cache memory, in step 412 PROC i performs a desired operation on the cache memory address allocated.

If the main memory block containing the access address has not been allocated in the cache memory, in step 409 PROC i will get access to the access address contained the main memory block.

In step 410, PROC i will cause allocation of a cache memory slot within an associated region for the main memory block containing the access address.

After allocating the cache memory slot at step 410, in step 412 PROC i performs desired operation on the cache memory address allocated.

In reading operation, step 412 writes the content stored in the main memory block into the cache memory slot allocated. In writing operation, however, step 412 write the desired content into both the main memory block containing the access address and the cache memory slot allocated.

The cache memory slot allocation shown in step 410 of FIG. 4 includes a mapping process, by which the main memory block is mapped into a cache memory slot using a specific mapping method.

Figure 5A:
FIG. 5A depicts the address format which is adaptable to associative mapping method.

One mapping method, which can be used by the present invention, is associative mapping method. FIG. 5A depicts the address format of a memory unit within a main memory block, which is adaptable to associative mapping method. The address consists of a block tag field and a word field.

Figure 6A:
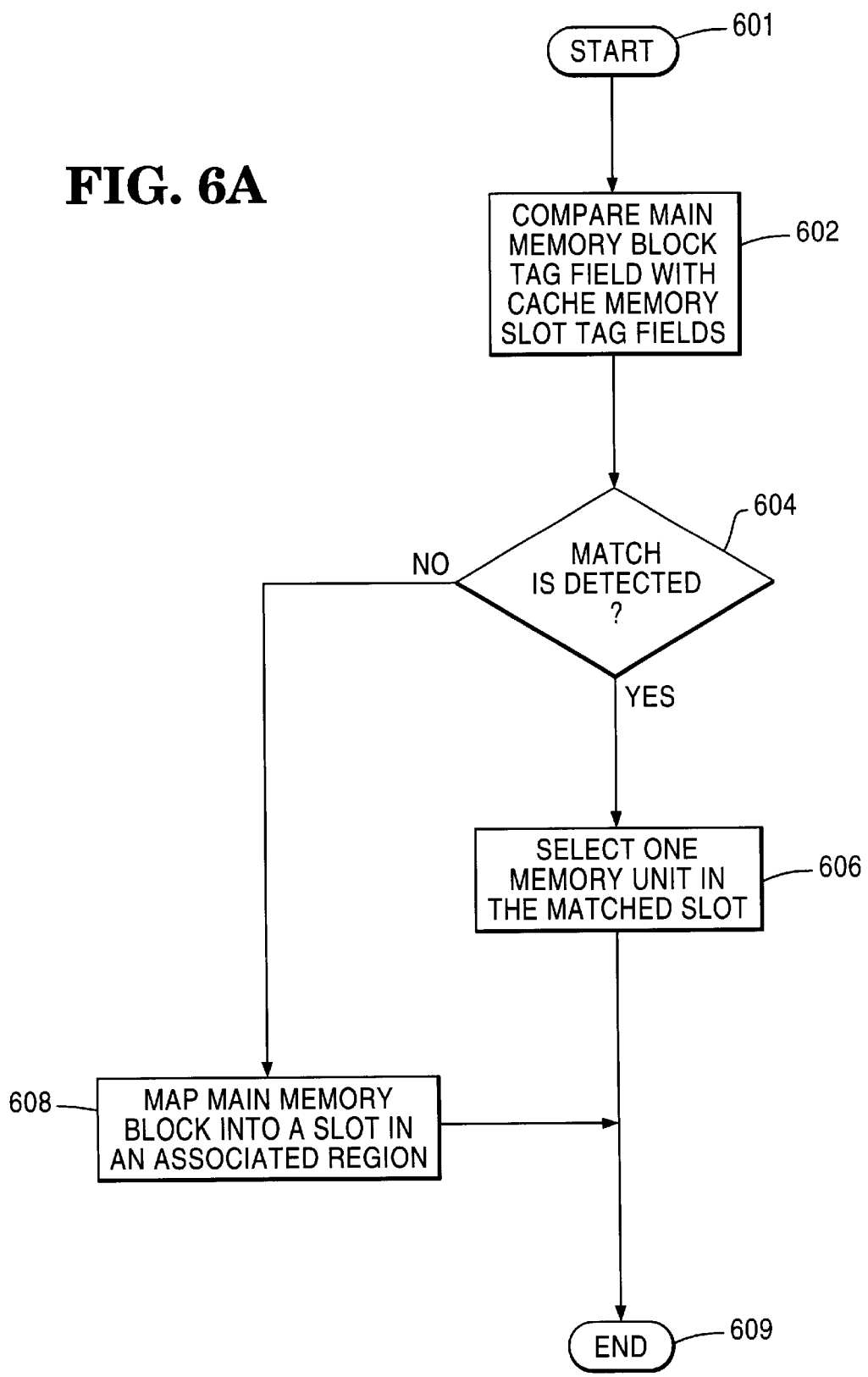
FIG. 6A depicts a flow chart showing the mapping process using associative mapping method, in accordance with the present invention.

FIG. 6A depicts a flow chart showing the mapping process using associative mapping method, in accordance with the present invention. In detecting whether the main memory block containing the access address has been allocated in cache memory, in step 602, a comparison is made between the main memory block tag field and all cache memory slot tag fields.

Step 604 determines whether a match is detected. The detection of a match indicates that the main memory block has been allocated in the cache memory. In step 606, the word field is then used to select one of the memory units in the matched slot.

If no match is detected, the main memory block has not been allocated in the cache memory. In step 608, the word field is used to map the main memory block into a slot within an associated region shown in FIG. 2. Under associative method, a main memory block can be mapped into any slot within the associated region. Thus, to increase the speed of match detection, cache memory contro logic 109 in FIG. 1 is able to simultaneously examine all slot tag fields of the cache memory shown in FIG. 2.

Figure 5B:
FIG. 5B depicts the address format which is adaptable to set-associative mapping method.

Another mapping method, which can be used by the present invention, is set-associative mapping method. FIG. 5B depicts the address format of a memory unit within a main memory block, which is adaptable to set-associative mapping method. The address consists of a block tag field, a set field, and a word field. The set number field is used to index the associated main memory block to a SET j (j=0, 1, . . . , n) shown in FIG. 3A or 3B.

Figure 6B:
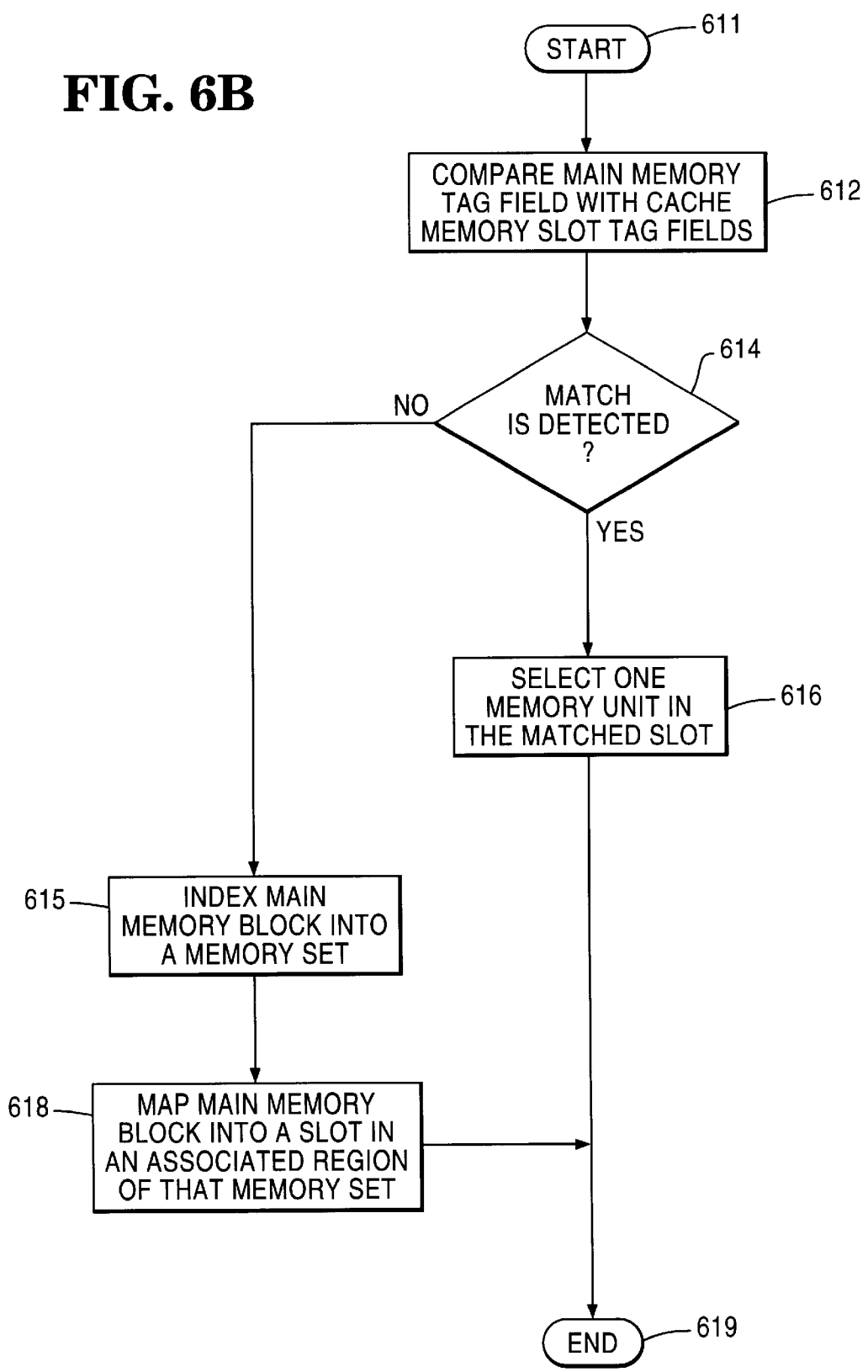
FIG. 6B depicts a flow chart showing the mapping process using set-associative mapping method, in accordance with the present invention.

FIG. 6B depicts a flow chart showing the mapping process using associative mapping method, in accordance with the present invention. Like associative mapping method, in step 612, set-associative mapping method also compares the main memory block tag field with all cache memory slot tag fields.

Step 614 determines whether a match is detected. The detection of a match indicates that the main memory block has been allocated in the cache memory. In step 616, the word field is used to select one of the memory units in the matched slot.

If no match is detected, in step 615, the set field is used to index the main memory block into a SET j (j=0, 1, . . . , n) as shown in FIG. 3B. And in step 618, the word field is used to map the main memory block into one of the slots in the associated region REG i (i=0, 1, 3, 4) shown in FIG. 3B. Under set-associative method, after SET j is selected, a main memory block can be mapped into any slot of the associated region within SET j. Thus, to increase the speed of match detection, cache memory control logic 109 in FIG. 1 is able to simultaneously examine all slot tag fields of all memory sets in the cache memory shown in FIGS. 3A and 3B.

As reflected in FIGS. 4, 6A and 6B, one of the features of the present invention is that PROC i (i=0, 1, 2, 3) can cause allocations only over the data it had fetched when a miss occurs.

The present invention creatively uses associative mapping method and set-associative mapping method to implement the novel cache memory allocation process. In the description above, applicant has sufficiently disclosed how to use these two mapping methods to enable those skilled in the art to implement the cache memory allocation process. Applicant, however, will not explain them in every detail because these two mapping methods themselves are well known to those skilled in the art.

It should be also noted that any suitable mapping methods can be used to implement the cache memory allocation process, in accordance the spirit of the present invention.

Although the present invention has been described with particular reference to certain preferred embodiments, variations and modifications of the present invention can be effected within the spirit and scope of the following claims.

What is claimed is:

1. In a computer system including a plurality of processors, a main memory and a cache memory, a method for managing the cache memory comprising the steps of:
   (a) dividing said cache memory into a plurality of regions;
   (b) associating each of said processors with a different one of said regions;
   (c) generating an access address to said main memory that contains data desired by one of said processors;
   (d) determining if a copy of said data resides in said cache memory;
   (e) providing access to said copy of said data residing in said cache memory if said copy of said data resides in any region within said cache memory; and
   (f) copying said data from said main memory into the region of said cache memory associated with said one of said processors if a copy of said data does not reside in any region within said cache memory.

2. The method of claim 1, wherein said step of copying said data further comprising the step of:
   mapping a block of said main memory containing said access address into the region of said cache memory associated with said one of said processors.

3. The method of claim 2, said region of said cache memory associated with said one of said processors contains a plurality of slots, wherein said step of mapping maps said block into at least one slot of said region of said cache memory associated with said one of said processors.

4. The method of claim 3, wherein said mapping step uses associative mapping.

5. The method of claim 3, wherein said mapping step uses set-associative mapping.

6. An apparatus for accelerating the access speed of a main memory, comprising:
   (a) a cache memory including a plurality of regions, said cache memory is shared by a plurality of processors, each of said processors is associated with one of said regions;
   (b) means for generating an access address that contains data desired by one of said processors; and
   (c) means for determining if a copy of said data resides in said cache memory;
   (e) means for providing access to said copy of said data residing in said cache memory if said copy of said data resides in any region within said cache memory; and
   (f) means for copying said data from said main memory into the region of said cache memory associated with said one of said processors if a copy of said data does not reside in any region within said cache memory.

7. The apparatus of claim 6, further comprising:
   means for mapping a block of said main memory containing said access address into said region of said cache memory associated with said one of said processors.

8. The apparatus of claim 7, said region of said cache memory associated with said one of said processors containing a plurality of slots, wherein said mapping means maps said block into at least one slot of said region of said cache memory associated with said one of said processors.

9. The apparatus of claim 8, wherein said mapping means maps said block into said at least one slot of said region of said cache memory associated with said one of said processors by using associative mapping.

10. The apparatus of claim 8, wherein said mapping means maps said block into said at least one slot of said region of said cache memory associated with said one of said processors by using set-associative mapping.

* * * * *